UNITED STATES PATENT OFFICE.

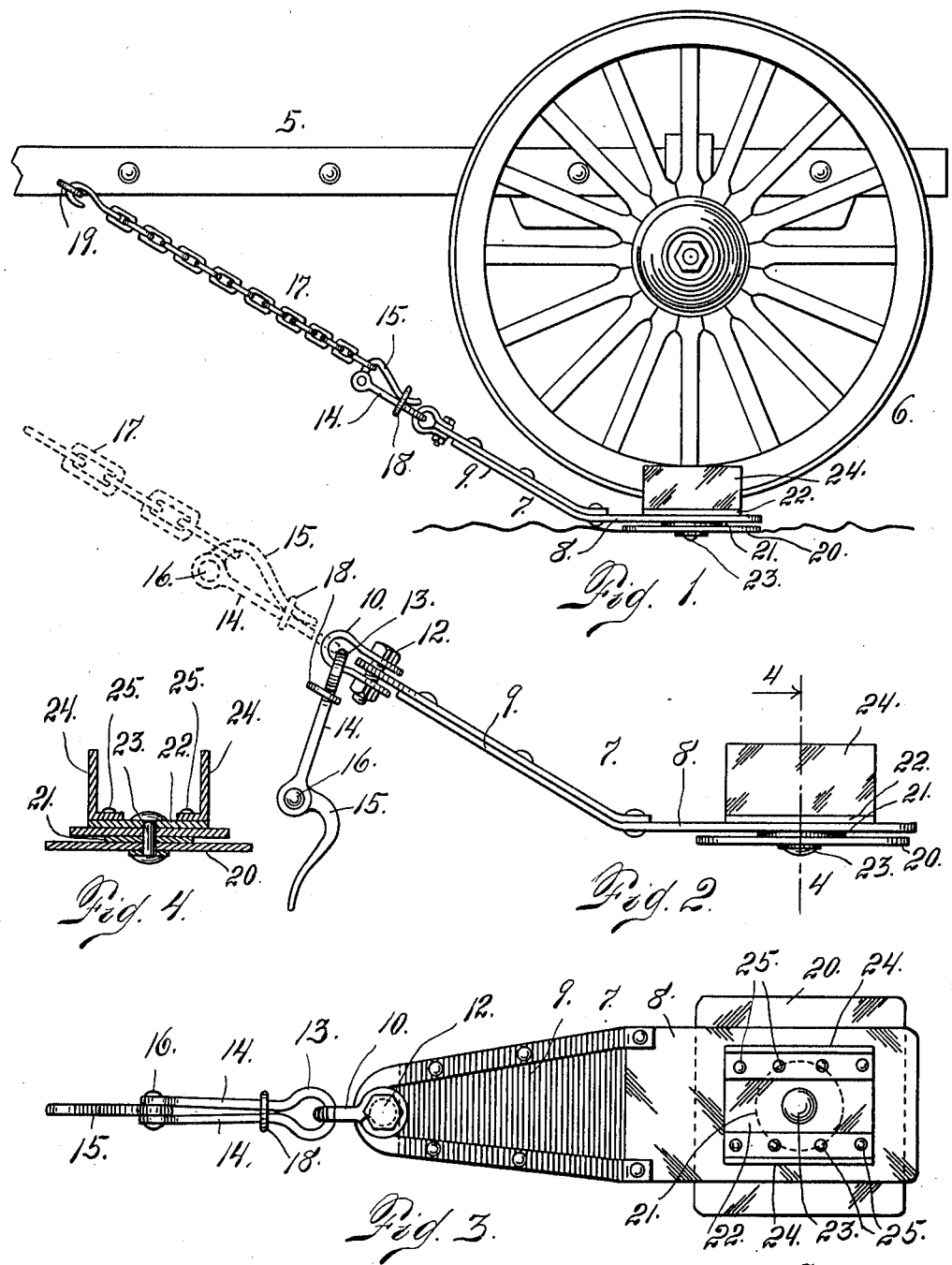

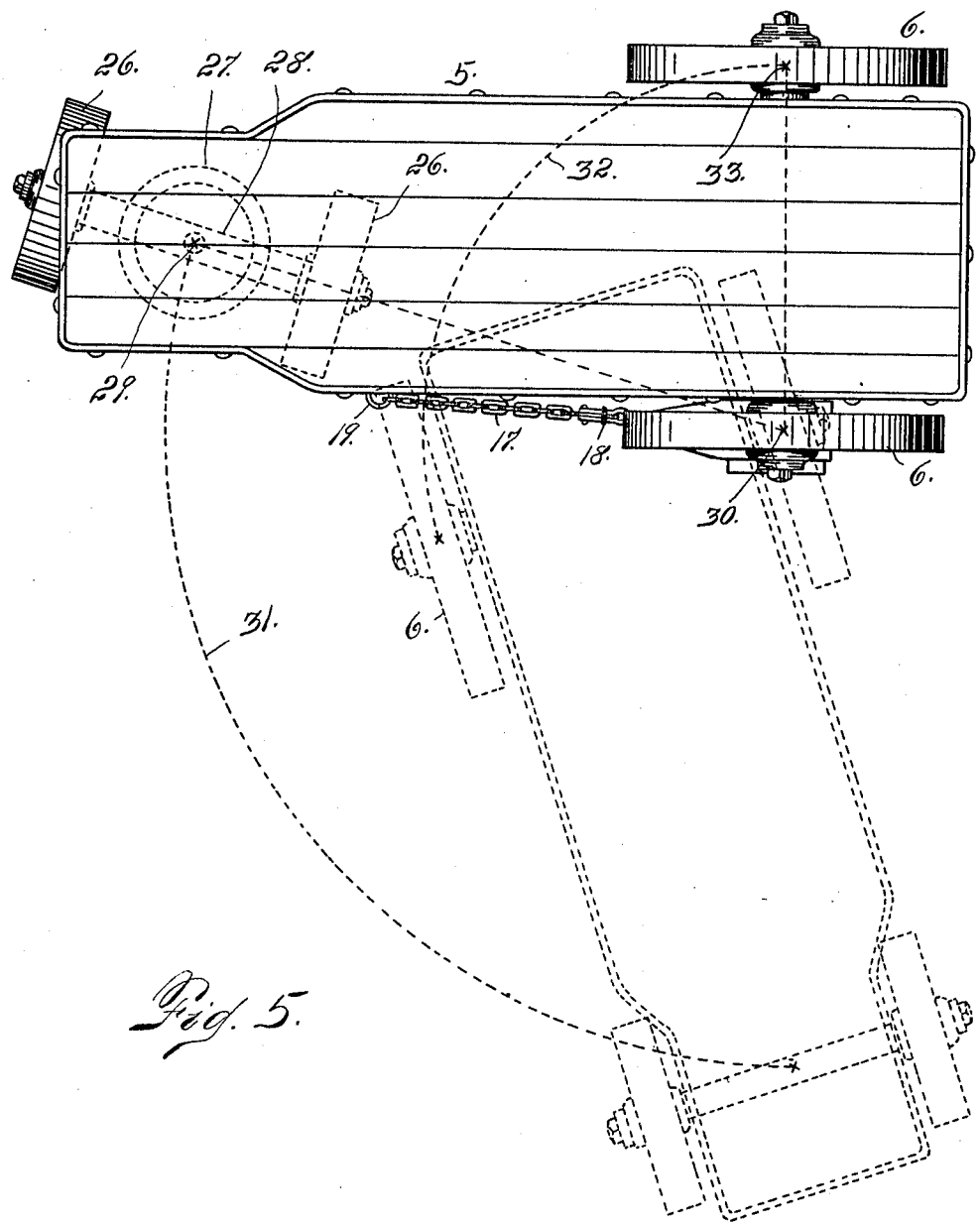

JOHN B. SPUHR, OF DENVER, COLORADO.

PIVOTED SUPPORT FOR VEHICLE-WHEELS.

1,020,723.  Specification of Letters Patent.  Patented Mar. 19, 1912.

Application filed December 27, 1910. Serial No. 599,441.

*To all whom it may concern:*

Be it known that I, JOHN B. SPUHR, a citizen of the United States, residing in the city and county of Denver and State of Colorado, have invented certain new and useful Improvements in Pivoted Supports for Vehicle-Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in pivoted supports for vehicle wheels, my object being to provide a device adapted to be engaged by one of the rear wheels of the vehicle so that when a short turn is made the wheel engaging the device virtually pivots on a vertical axis passing through the axis upon which the wheel rotates, the support being equipped with a member which pivots on a stationary part of the device, the pivoted member being in direct engagement with the wheel. This device prevents the wheel from cutting into the ground during a turn of this character and is of great advantage, particularly when the vehicle is heavily loaded or the ground somewhat soft.

The device consists of a base plate which remains stationary upon the ground; a plate above the base plate having an upturned end forward of the wheel, connected with the vehicle by means of a chain or in any other suitable manner; and a pivoted device above the last named member, the pivoted device being in direct engagement with the wheel and having plates projecting upwardly on opposite sides of the rim of the wheel, whereby as the wheel turns on its vertical axis as aforesaid, it carries the pivoted plate with it, while the lowermost part remains stationary.

Having briefly outlined my improved construction, I will proceed to describe the same in detail, reference being made to the accompanying drawing in which is illustrated an embodiment thereof.

In this drawing: Figure 1 is a side elevation of a vehicle wheel with my improved device applied, the rear portion of the vehicle frame being shown. Fig. 2 is a view of the device shown in detail and on a larger scale. Fig. 3 is a top plan view of the same. Fig. 4 is a section taken on the line 4—4, Fig. 2. Fig. 5 is a top plan view of a vehicle equipped with my improvement, the action of the device and the movement of the vehicle when the latter makes a short turn being indicated by dotted lines.

The same reference characters indicate the same parts in all the views.

Let the numeral 5 designate the framework of the vehicle, and 6 the rear wheels thereof.

My improved device includes a body member 7 having a horizontally disposed part 8 and an upwardly inclined part 9, the latter tapering upwardly from the part 8 and being equipped at its forward extremity with a clevis 10 which is connected to the part 9 by a bolt 12. Connected with this clevis is an eye 13 having forwardly extending arms 14 to whose forward extremities is attached a pivoted hook 15, by means of a rivet 16. This hook when the parts are assembled, is connected with one extremity of a chain 17, the hook being held in interlocking relation with the arms 14 by means of a ring 18. The opposite extremity of the chain 17 is connected with the framework of the vehicle as shown at 19.

Below the plate 8 is a base plate 20, a washer 21 being interposed between the two plates 8 and 20 to reduce the friction between the said plates during the turning operation of the vehicle, since it will be understood that the plate 8 must turn with the vehicle as it is connected with the framework. Above the plate 8 is a plate 22 which is pivotally connected with the plates 8 and 20 by a pivot pin 23. This pivoted plate 22 is provided with side members 24 projecting upwardly from the plate 22 on opposite sides of the rim of the wheel when the device is in use (see Fig. 1). As shown in the drawing the side parts 24 are angle-shaped and connected with the pivoted plate 22 by rivets 25. It is evident, however, that the pivoted member which the wheel engages may be of any suitable construction.

In Fig. 5 of the drawing the manner in which my improved device operates is clearly illustrated, and in this view the front wheels of the vehicle are designated 26, the fifth wheel 27, the axle 28 and its pivotal center 29. When it is desired to make a short turn, the front axle together with the wheels 26, are turned on the vertical axis 29 until they reach substantially a position corresponding to that indicated in Fig. 6, where one of the wheels 26 is shown in full lines and the other in dotted lines, underneath the body or framework of the vehicle. Then as the team is driven forwardly the vehicle assumes the position indicated by dotted lines. During such movement the rear wheel 6 on the side toward which the vehicle is turned, pivots on a vertical axis 30 passing through the center of what may be termed the near wheel of the vehicle. As the wheel turns it carries the plate 22 around with it, this plate facilitating the turning action, while the part 8 turns with the body of the vehicle, the part 20 below remaining stationary by virtue of its engagement with the ground, the pivoted pin 23 being sufficiently loose for the purpose. The part 20 forms a support of sufficient surface area to prevent the weight of the load from forcing the device into the ground. The dotted arcs 31 and 32 in Fig. 5 indicate the travel respectively of the axis 29 and an axis 33 passed through the vertical center of the off rear wheel 6 during the turning action of the vehicle from the position shown in full lines to that shown in dotted lines. These arcs are struck from the axis 30 of the pivoted member 22 as a center. After the vehicle has been turned as indicated by dotted lines in Fig. 5, my improved device has performed its function and it may be detached from the vehicle by slipping the ring 18 over the free end of the hook 15. Then as the vehicle moves, the chain 17 will be released by reason of the movement of the hook, to the position shown by full lines in Fig. 2, and the wheel will roll over the device leaving it behind, thus preventing the necessity of backing up as would be required in the absence of provision intermediate the vehicle frame and the device for breaking the connection.

Having thus described my invention, what I claim is:

1. The combination with a vehicle, of a plate composed of a horizontally disposed member and an upwardly inclined forward extension, suitable means for connecting the forward extremity of the said plate with the framework of the vehicle, a base plate below the first named plate, and a third plate above the first named plate and pivotally connected with the two lower plates, the third plate having upwardly projecting side parts adapted to engage the rim of a rear wheel of the vehicle, for the purpose set forth.

2. The combination with a vehicle, of a plate having a horizontally disposed member and a forward extension inclined upwardly, a flexible device connected at one extremity with the vehicle frame, a pivoted hook connecting the forward extremity of the said plate with the said chain, means for holding the pivoted hook in interlocking relation with the plate and the chain, a base plate below the first named plate, and a member pivotally connected with the horizontal member of the said plate and with the base plate and adapted to turn with the rear wheel of the vehicle on an axis passing through the vertical center of the wheel, substantially as described.

3. A device of the class described, comprising a base plate, a top plate, and an intermediate plate, the intermediate plate and the top plate being pivotally connected with the bottom plate, and a suitable connection between the intermediate plate and the frame-work of the vehicle, the top plate being adapted to be engaged by one of the wheels of the vehicle, for the purpose set forth.

In testimony wherof I affix my signature in presence of two witnesses.

JOHN B. SPUHR.

Witnesses:
F. E. BOWEN,
A. EBERT O'BRIEN.

---

Copies of this patent may be obtained for five cents each, by addressing the "Commissioner of Patents, Washington, D. C."